United States Patent [19]
Suzuki

[11] Patent Number: 5,794,469
[45] Date of Patent: Aug. 18, 1998

[54] STEERING LOCK DEVICE

[75] Inventor: Noriyuki Suzuki, Aichi, Japan

[73] Assignee: Kabushiki Kaisha Tokai Rika Denki Sesakusho, Aichi, Japan

[21] Appl. No.: 908,560

[22] Filed: Aug. 8, 1997

Related U.S. Application Data

[63] Continuation of Ser. No. 530,443, Sep. 19, 1995, abandoned, which is a continuation of Ser. No. 132,830, Oct. 7, 1993, abandoned.

[30] Foreign Application Priority Data

Oct. 12, 1992 [JP] Japan ............... 4-070852 U

[51] Int. Cl.$^6$ ............................................. B60R 25/00
[52] U.S. Cl. ........................... 70/252; 70/186; 70/247
[58] Field of Search .......................... 70/182–186, 252, 70/389, 245–251; 477/99

[56] References Cited

U.S. PATENT DOCUMENTS

| | | | |
|---|---|---|---|
| 4,759,203 | 7/1988 | Lieb et al. | 70/252 X |
| 4,854,193 | 8/1989 | Newman et al. | 70/248 X |
| 4,884,423 | 12/1989 | Fancher | 70/252 X |
| 4,905,802 | 3/1990 | Gotoh | 70/247 X |
| 5,117,664 | 6/1992 | Kurozu et al. | 70/252 |
| 5,226,303 | 7/1993 | Dieden et al. | 70/247 |

FOREIGN PATENT DOCUMENTS

| | | | |
|---|---|---|---|
| 2595399 | 9/1987 | France | 70/252 |
| 3227256 | 12/1983 | Germany | 70/252 |
| 4102046 | 7/1992 | Germany | 70/245 |
| 4206250 | 9/1992 | Germany | 70/245 |
| 4206251 | 9/1992 | Germany | 70/245 |
| 2-103833 | 8/1990 | Japan . | |
| 4063748 | 2/1992 | Japan | 70/247 |
| 2571722 | 10/1996 | Japan . | |
| 2571723 | 10/1996 | Japan . | |
| 2160485 | 12/1985 | United Kingdom | 70/248 |

*Primary Examiner*—Lloyd A. Gall
*Attorney, Agent, or Firm*—Finnegan, Henderson, Farabow, Garrett & Dunner, L.L.P.

[57] ABSTRACT

An object of this invention is to provide a steering lock device of the type that a key rotor is coupled to the shift lever of an automatic transmission, which is reduced in size, thus occupying a relatively small space when installed. The steering lock device, an accommodating section, which accommodates a rotary member and a slider, is provided on the outer cylindrical surface of a housing in such a manner that it is located above the axis of the housing, and its longitudinal direction is in parallel with the direction of a tangent line to the outer cylindrical surface of the housing, whereby the accommodating section is not so much protruded from the sidewalls of the housing. The rotary member is turned about its shaft by a cam which is turned together with a key rotor. The slide is moved longitudinally of the accommodating section in association with the movement of the shift lever.

5 Claims, 3 Drawing Sheets

FIG. 4
FIG. 5
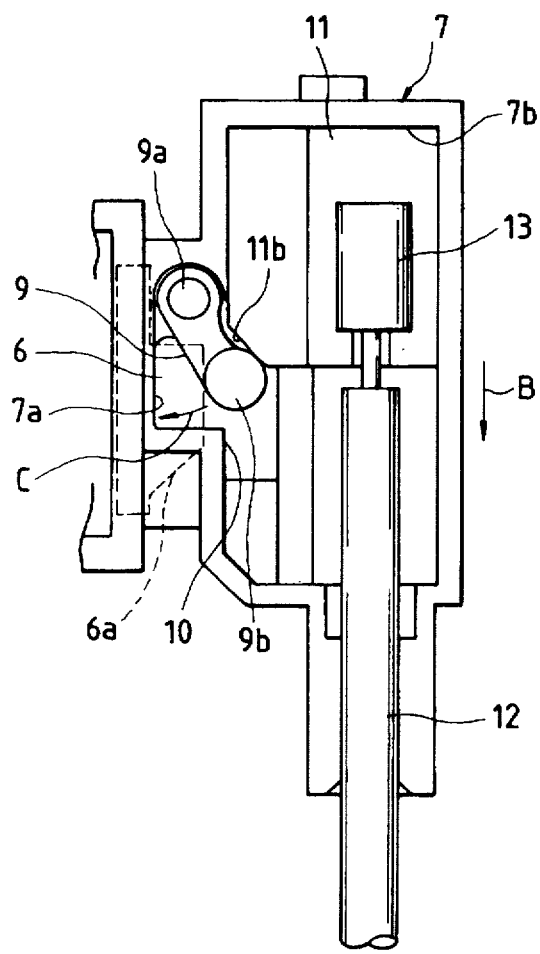
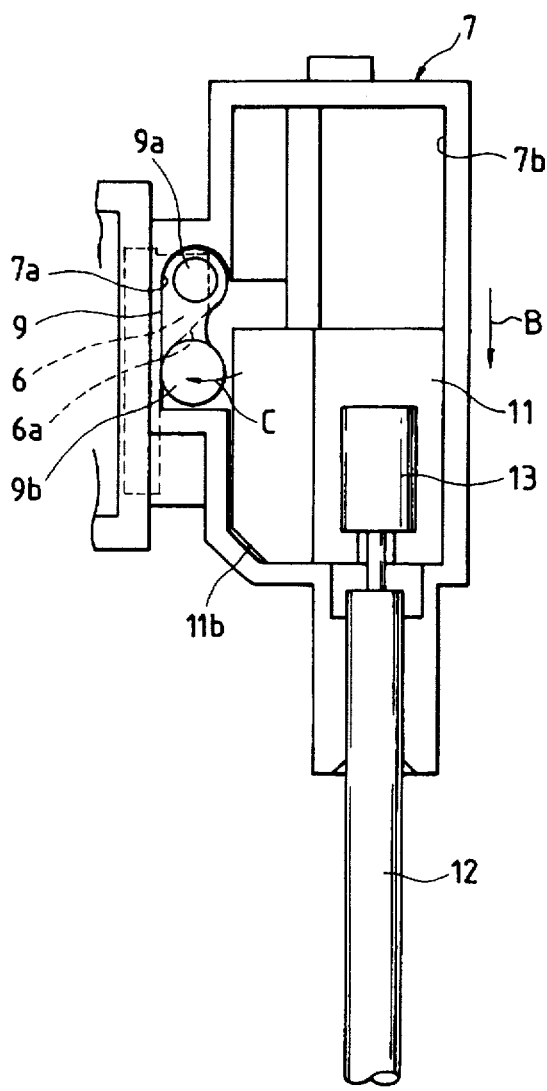

STEERING LOCK DEVICE

This application is a continuation of application Ser. No. 08/530,443, filed Sep. 19, 1995, now abandoned, which is a continuation application of application Ser. No. 08/132,830, filed Oct. 7, 1993, also abandoned.

BACKGROUND OF THE INVENTION

1. Field of the Invention

This invention relates to a steering lock device of the type that a key rotor, which is turned with a key, is coupled to a shift lever provided for an automatic transmission.

2. Related Art

Recently, an automobile with an automatic transmission has been provided with a steering lock device of the type that a key rotor, which is turned with a key, is coupled to the shift lever of the automatic transmission, so that, when the key rotor is at the locking position, namely, the "LOCK" position, it is inhibited to shift the shift lever from the parking position to other positions, and when the shift lever is at other than the parking position, it is inhibited to turn the key rotor from an operating position, namely, the "ACC" position to the "LOCK" position.

For instance, Unexamined Japanese Utility Patent Application No. 103833/1990 has disclosed the following steering lock device: A cam is provided in a housing accommodating a key rotor in such a manner that it is turned together with the key rotor. An accommodating section is provided on the outer cylindrical surface of the housing in such a manner that it is projected sidewards of the housing. A slide member is slidably provided in the accommodating section in such a manner that it is operated in association with the shift lever through a cable. In addition, a cam lever is provided in it which turns as the slide member is slid.

When, in the steering lock device, the key rotor is at the "LOCK", the turning of the cam lever is prevented by the cam, and therefore the shifting of the shift lever from the parking position to any other position is inhibited. When the shift lever is set at other than the parking position, the turning of the cam is prevented by the cam lever, and therefore the turning of the key rotor from the "ACC" position to the "LOCK" position is prevented.

In the above-described conventional steering lock device, the accommodating section accommodating the slide member and the cam lever is greatly protruded sidewards of the housing. Hence, in installation of the device, it is necessary to provide a relatively large space for it.

SUMMARY OF THE INVENTION

An object of this invention is to provide a steering lock device of the type that a key rotor is coupled to the shift lever of an automatic transmission, which is reduced in size so as to occupy a relatively small space when installed.

The foregoing object of this invention has been achieved by the provision of a steering lock device which, according to the invention, comprises: a key rotor provided in a housing, the key being turned between a locking position and operating positions with a key inserted thereinto; a cam which is turned together with the key rotor; an accommodating section formed on the outer cylindrical surface of the housing in such a manner that the accommodating section is located above the axis of the housing and the longitudinal direction thereof is in parallel with the direction of a tangent line to the outer cylindrical surface of the housing; a rotary member provided in the accommodating section in such a manner that the rotary member is swingable between a regulating position and a releasing position, the rotary member being swung to the regulating position and held there when the key rotor is turned to the locking position, and the rotary member being allowed to swing from the regulating position to the releasing position when the key rotor is turned to any one of the operating positions; and a slider provided in the accommodating section in such a manner that the slider is movable between a locking position and an unlocking position, the slider operating as follows: when a shift lever is shifted to a parking position, the slider is moved to the unlocking position, when, under this condition, the rotary member is held at the regulating position by the cam, movement of the slider from the unlocking position to the locking position is inhibited, and when the shift lever is shifted to other than the parking position, the slider is moved to the locking position, so that, under this condition, the swinging of the rotary member from the releasing position to the regulating position is prevented.

When, in the steering lock device thus constructed, the key rotor is at the locking position, the rotary member is set at the regulating position by the cam, and movement of the slider from the unlocking position to the locking position is prevented by the rotary member thus set, whereby the shifting of the shift lever from the parking position to any other position is inhibited. When the shift lever is at other than the parking position, the slider is moved to the locking position, so that the turning of the rotary member from the releasing position to the regulating position is prevented by the slider thus moved, whereby the turning of the cam is inhibited by the rotary member, and the turning of the key rotor from the operating position to the locking position is inhibited.

The accommodating section, which accommodates the rotary member and the slider, is provided on the outer cylindrical surface of the housing in such a manner that it is located above the axis of the housing, and its longitudinal direction is in parallel with the direction of a tangent line to the outer cylindrical surface of the housing. Hence, the accommodating section is not so much projected sidewards of the housing.

BRIEF DESCRIPTION OF THE DRAWINGS

FIGS. 4 and 5 are plan views showing essential components of the steering lock device, for a description of the operation of the steering lock device.

DETAILED DESCRIPTION OF THE PREFERRED EMBODIMENT

One preferred embodiment of this invention will be described with reference to the accompanying drawings.

Figure 1:
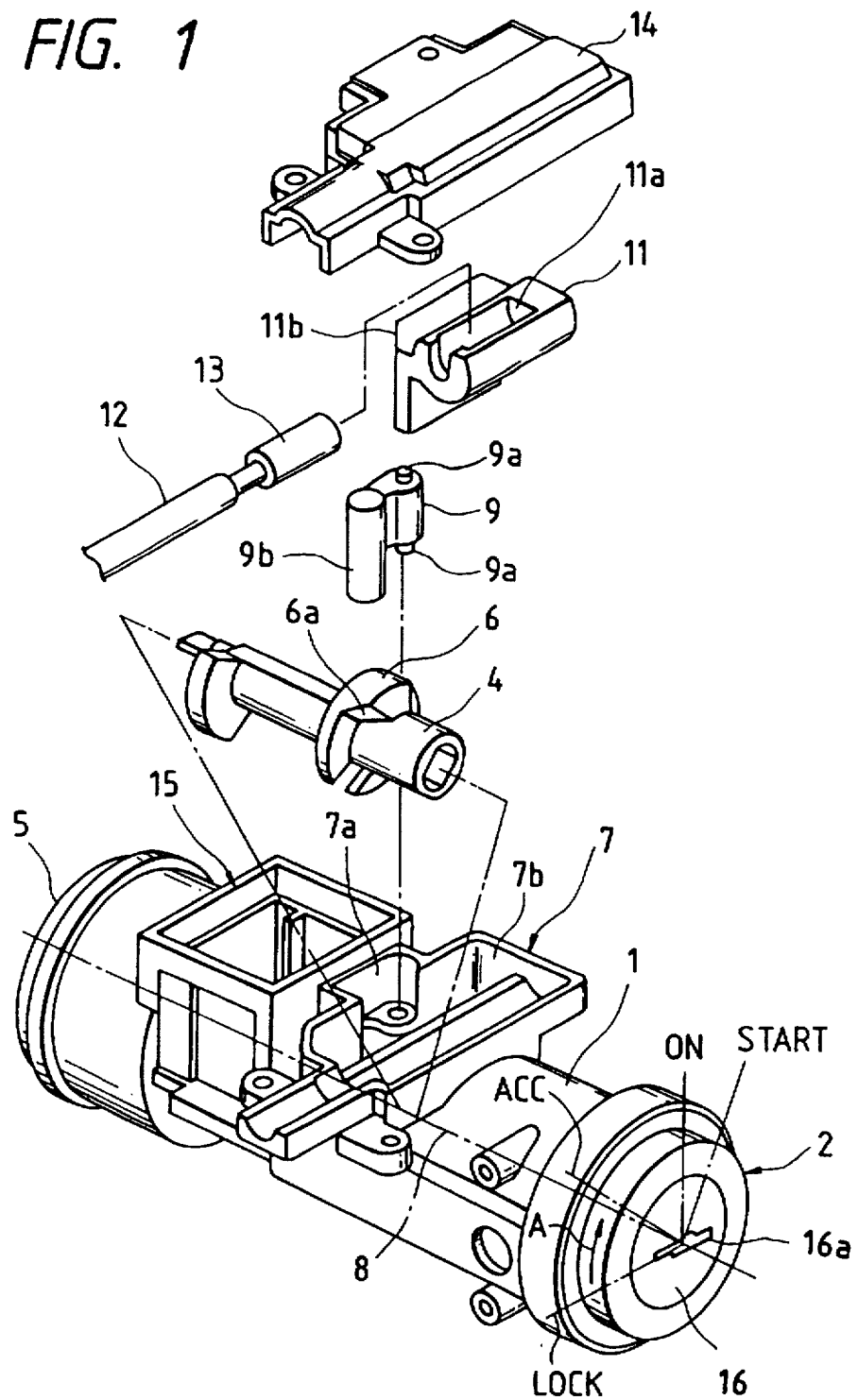
FIG. 1 is an exploded perspective view showing essential components of a steering lock device, which constitutes one embodiment of this invention.

As shown in FIG. 1, a housing 1 is substantially in the form of a cylinder, and a conventional cylinder lock 2 is provided on the front end of the housing, and a key rotor 16 is rotatably provided in the cylinder lock 2.

When the key rotor 16 is at a locking position, namely, a "LOCK" position, a key (not shown) can be inserted into a key hole 16a or removed from it. As the key thus inserted is turned in the direction of the arrow A, the key rotor is turned to operating positions, namely, an "ACC" position, "ON" position, and "START" position, successively. When the key rotor is at any one of the operating positions, removal of the key from the key hole is inhibited.

A shaft 4, which is turned together with the key rotor 16, is provided behind the key rotor 16. An ignition switch 5 is operated through the shaft 4. A cam 6 is formed on the shaft 4 near the front end. The cam 6 has a sloped surface 6a on its one side. The shaft 4 is built in the housing 1 as follows: Before the cylinder lock 2 is built in the housing 1, the shaft 4 is inserted into the housing 1 through the front opening of the latter 1.

The housing 1 has an accommodating section 7 on the outer cylindrical surface in correspondence to the cam 6. The accommodating section 7 is made up of first and second accommodating chambers 7a and 7b. The accommodating section 7 is formed on the outer cylindrical surface of the housing 1 in such a manner that it is located above the axis 8 of the housing 1; i.e., the axis of the key rotor 16, and its longitudinal direction is in parallel with the direction of a tangent line to the outer cylindrical surface of the housing 1.

Figure 2:
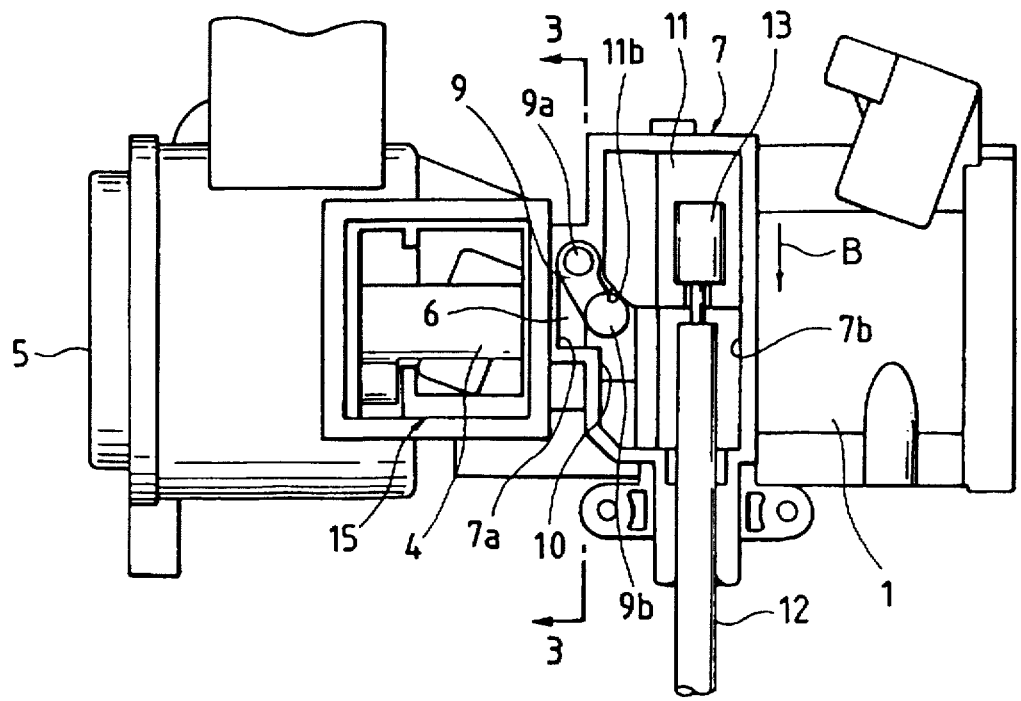
FIG. 2 is a plan view of the steering lock device with its cover removed.
Figure 3:
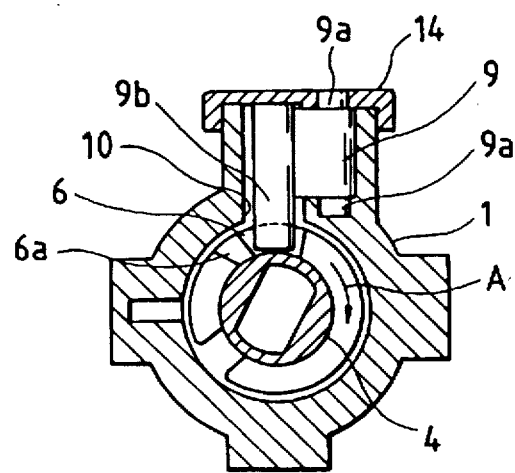
FIG. 3 is a sectional view taken along line 3—3 in FIG. 2.

As shown in FIGS. 2 and 3, a rotary member 9 is rotatably mounted through a shaft 9a in the first accommodating chamber 7a which corresponds to the periphery of the cam 6. The free end portion of the rotary member 9 is formed into a cylindrical regulating portion 9b. One end portion of the cylindrical regulating portion 9b is extended towards the cam 6 (or inwardly of the housing 1) through a hole 10 (FIG. 3) formed in the housing 1.

The rotary member 9 is swingable between a regulating position where the regulating portion 9b is protruded towards the second accommodating chamber 7b as shown in FIGS. 2 and 4 and a releasing position where the regulating portion 9b is accommodated in the first accommodating chamber 7a as shown in FIG. 5. That is, when the key rotor 3 is turned to the "LOCK" position, the regulating portion 9b is turned to the regulating position by the cam 6 and held there. As the key rotor 16 is turned to the operating position, the regulating portion, being released from the cam, is allowed to turn from the regulating position to the releasing position.

A slider 11 is provided in the second accommodating chamber 7b of the accommodating section 7 in such a manner that it is slidable longitudinally of the second accommodating chamber 7b. The slider 11 has an accommodating recess in the upper surface, and a sloped surface 11b at the corner on the side of the rotary member 9. A connecting part 13 connected to a cable 12 is set in the accommodating recess 11a of the slider 11. The other end of the cable 12 is coupled to the shift lever of the automatic transmission (not shown).

As the shift lever is shifted to the parking position, the slide 11 is moved (upwardly in FIG. 2 or 4) to an unlocking position through the cable 12 as shown in FIG. 2 or 4. As the shift lever is shifted to other than the parking position, the slider 11 is moved (downwardly in FIG. 5) to a locking position as shown in FIG. 5.

The accommodating section 7 is covered with a cover 14, which rotatably supports the upper end of the shaft 9a of the rotary member 9.

The shaft 4 has a cam 6 for a steering lock (not shown) (hereinafter referred to as "a steering lock cam", when applicable) in addition to the above-described cam 6. Furthermore, in the housing 1, a steering lock accommodating section 15 is provided between the above-described accommodating section 7 and an ignition switch 5. The steering lock accommodating section 15 accommodates a movable frame (not shown) moved by the steering lock cam, a lock bar (not shown), and a spring (not shown) urging the frame and the lock bar towards the steering shaft, so that, when the key rotor 16 is turned to the "LOCK" position, the end of the lock bar is engaged with the steering shaft to lock the latter, and when the key rotor 16 is turned to the operating position, the steering shaft is unlocked.

The steering lock device thus constructed operates as follows:

When the key rotor 16 is at the "LOCK" position, the cam 6 is positioned as shown in FIG. 2 or 4, so that the rotary member 9 is held at the regulating position (cf. FIG. 2 or 4) by the cam 6. At the same time, the shift lever (not shown) is at the parking position, and therefore the slider 11 is at the unlocking position (cf. FIGS. 2 and 4). In addition, the steering shaft is locked being engaged with the lock bar.

When, under this condition, it is tried to move the shift lever from the parking position to any other position, the slide 11 is pulled in the direction of the arrow B (FIG. 2 or 4) through the cable 12, and the sloped surface 11b of the slider 11 pushes the regulating portion 9b of the rotary member 9. However, in this case, the rotary member 9 is held at the regulating position; that is, turning the rotary member 9 to the releasing position is prevented, and therefore it is impossible to move the slider 11 from the unlocking position to the locking position.

Accordingly, when the key rotor 16 is at the "LOCK" position, it is inhibited to move the shift lever from the parking position to any other position.

When, under this condition, the key rotor 16 is turned in the direction of the arrow A to the "ACC" position with the key inserted into it, the cam 6 is turned in the same direction, so that it is shifted from the position corresponding to the regulating portion 9b of the rotary member 9 (FIG. 5), whereby the rotary member 9 is allowed to turn from the regulating position to the releasing position. As the key rotor 16 is turned in the above-described manner, the lock bar is disengaged from the steering shaft; that is, the steering shaft is unlocked.

When, with the key rotor 16 set at one of the operating positions (for instance at the "ACC" position), the shift lever is shifted from the parking position to any other position, the slider 11 is pulled in the direction of the arrow B through the cable 12, thus being moved to the locking position as shown in FIG. 5. At the same time, the regulating portion 9b of the rotary member 9 is pushed by the sloped surface 11b, so that the rotary member 9 is turned about the shaft 9a in the direction of the arrow C to the releasing position.

Hence, with the key rotor 16 set at the operating position, the shift lever can be shifted from the parking position to any other position.

When, on the other hand, the shift lever is at other than the parking position; for instance, the drive position, the slider 11 is at the locking position as shown in FIG. 5. Therefore, the slider 11 prevents the rotary member 9 from turning from the releasing position to the regulating position (i.e., turning in the direction opposite to the direction of the arrow C).

Even if, under this condition, it is tried to turn the key rotor 3 from the operating position, for instance the "ACC" position, to the "LOCK" position, it is impossible to do so because the sloped surface 6a of the cam 6 abuts against the regulating portion 9b of the rotary member 9.

Hence, with the shift lever set at other than the parking position, it is impossible to turn the key rotor 16 to the "LOCK" position. This technique eliminates the difficulty that carelessly the key is removed, or the steering shaft is locked.

When, with the key rotor 16 set at the operating position, the shift lever is shifted to the parking position from any other position, then slider 11 is moved in the direction opposite to the direction of the arrow B through the cable 12, thus being set at the releasing position. Therefore, the rotary member 9 is allowed to turn from the releasing position in the direction opposite to the direction of the arrow C.

When, under this condition, the key rotor 16 at the operating position is turned in the direction opposite of the arrow A, then it can be turned to the "LOCK" position because the sloped surface 6a of the cam 6 turns the rotary member 9 in the direction opposite to the direction of the arrow C.

Thus, when, with the key rotor 3 set at the operating position, the shift lever is shifted to the parking position, the key rotor 16 can be turned to the "LOCK" position.

When the key rotor 16 has been turned to the "LOCK" position, the rotary member 9 is turned to the regulating position by the cam 6 as shown in FIG. 2 or 4, and as was described before, the slider 11 is set at the unlocking position.

In the above-described embodiment, the accommodating section 7 accommodating the rotary member 9 and the slide 11 is formed on the outer cylindrical surface of the housing in such a manner that it is located above the axis 8 of the housing 1 and its longitudinal direction is in parallel with the direction of a tangent line to the outer cylindrical surface of the housing 1. Therefore, the accommodating section 7 is not so much projected sidewards of the housing. Thus, the steering lock device of the invention is much smaller in size than the conventional one in which the accommodating section is projected greatly sidewards of the housing. Accordingly, the space occupied thereby is smaller.

In the above-described embodiment, when, with the key rotor 16 set at the "LOCK" position (with the rotary member 9 held at the regulating position) it is tried to shift the shift lever from the parking position to any other position (it is tried to move the slider 11 from the unlocking position to the locking position), or when, with the shift lever shifted to the parking position (with the slider 11 held at the locking position), it is tried to turn the key rotor 16 from the operating position to the "LOCK" position, no unreasonable force is applied to the cover 14 by the rotary member 9 or the slider 11. Hence, all that is additionally required for the cover 14 covering the rotary member 9 and the slider 11 is to support one end portion of the shaft 9a of the rotary member 9.

As was described above, in the steering lock device of the type that the key rotor is coupled to the shift lever of the automatic transmission, the accommodating section accommodating the rotary member and the slide is formed on the outer cylindrical surface of the housing in such a manner that it is located above the axis of the housing and its longitudinal direction is in parallel with the direction of the tangent line to the outer cylindrical surface of the housing. Therefore, the accommodating section is not so much projected sidewards of the housing. Thus, the steering lock device of the invention is much smaller in size than the conventional one in which the accommodating section is projected greatly sidewards of the housing, and accordingly smaller in the space occupied thereby. Those effects should be highly appreciated.

What is claimed is:

1. A steering lock device comprising:

a key rotor in a housing, the key rotor being turnable between a locking position and operating positions with a key inserted thereinto;

a cam turnable together with the key rotor;

an accommodating member attached and tangent to a periphery of the housing;

a rotary member mounted within the accommodating member including a rotary member pivot axis normal to a key rotor axis, the rotary member being swingable between a regulating position and a releasing position upon turning of the key rotor from the key rotor locking position to the key rotor operating positions; and a slider located within the accommodating member and movable between an unlocking position and a locking position upon movement of the rotary member from the regulating position to the releasing position.

2. A steering lock device as claimed in claim 1, wherein the rotary member is swung to the regulating position and held there when the key rotor is turned to the locking position.

3. A steering lock device as claimed in claim 2, wherein, when the rotary member is held at the regulating position by the cam, movement of the slider from the unlocking position to the locking position is prevented, corresponding to a shift mechanism remaining in a parking position, and wherein, when the slider is moved from the unlocking position to the locking position, corresponding to a shift mechanism being placed in other than a parking position, the swinging of the rotary member from the releasing position to the regulating position is prevented.

4. A steering lock device, comprising:

a key rotor in a housing, the key rotor being rotatable between a locking position and an operating position using a key inserted thereinto;

a cam mounted for rotation together with the key rotor;

an accommodating member located on a periphery of the housing;

a rotary member mounted within the accommodating member including a rotary member pivot axis normal to a rotating axis of the key rotor, the rotary member being swingable between a regulating position and a releasing position upon turning of the key rotor from the key rotor locking position to the key rotor operating position; and a slider located within the accommodating member and movable between an unlocking position and a locking position upon movement of the rotary member from the regulating position to the releasing position.

5. A steering lock device as claimed in claim 4, further comprising:

a connecting means connected to said slider, wherein said connecting means is pullable between a locking and an unlocking position upon rotation of the key rotor from the key rotor locking position to the key rotor operating position.

* * * * *